United States Patent
Tort et al.

(10) Patent No.: US 12,384,957 B2
(45) Date of Patent: *Aug. 12, 2025

(54) PROCESS FOR EXTRACTING A CRUDE OIL WITH INJECTION OF RESIN

(71) Applicant: TOTALENERGIES ONETECH, Courbevoie (FR)

(72) Inventors: Frédéric Tort, Solaize (FR); Olivier Langlois, Solaize (FR); Mohamed Saïdoun, Solaize (FR)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/786,524

(22) PCT Filed: Dec. 9, 2020

(86) PCT No.: PCT/EP2020/085235
§ 371 (c)(1),
(2) Date: Jun. 16, 2022

(87) PCT Pub. No.: WO2021/122206
PCT Pub. Date: Jun. 24, 2021

(65) Prior Publication Data
US 2023/0039745 A1     Feb. 9, 2023

(30) Foreign Application Priority Data
Dec. 20, 2019  (FR) ........................ 1915189

(51) Int. Cl.
| C09K 8/588 | (2006.01) |
| C09K 8/594 | (2006.01) |
| E21B 43/16 | (2006.01) |

(52) U.S. Cl.
CPC .............. *C09K 8/588* (2013.01); *C09K 8/594* (2013.01); *E21B 43/16* (2013.01)

(58) Field of Classification Search
CPC .......... C09K 8/588; C09K 8/594; E21B 43/16
See application file for complete search history.

(56) References Cited

U.S. PATENT DOCUMENTS

| 4,178,951 | A |  | 12/1979 | Sweeney |  |
| 4,758,365 | A |  | 7/1988 | Gilles et al. |  |
| 5,494,607 | A |  | 2/1996 | Manek et al. |  |
| 5,697,988 | A |  | 12/1997 | Malfer et al. |  |
| 9,840,661 | B2 | * | 12/2017 | Agashe | ................ C09K 8/5758 |
| 10,781,358 | B2 | * | 9/2020 | Merli | ...................... E21B 37/00 |
| 2012/0181028 | A1 | * | 7/2012 | Daussin | .................... C02F 9/00 |
|  |  |  |  |  | 166/305.1 |
| 2013/0186629 | A1 | * | 7/2013 | Leonard | ................. C09K 8/524 |
|  |  |  |  |  | 166/305.1 |
| 2014/0262280 | A1 | * | 9/2014 | Hill | ........................ C09K 8/524 |
|  |  |  |  |  | 507/240 |
| 2015/0203740 | A1 | * | 7/2015 | Shong | ...................... C09K 8/58 |
|  |  |  |  |  | 166/305.1 |
| 2016/0046884 | A1 |  | 2/2016 | Dolmazon et al. |  |
| 2018/0079976 | A1 |  | 3/2018 | Tort et al. |  |
| 2019/0144737 | A1 | * | 5/2019 | Morales | ................. C09K 8/584 |
|  |  |  |  |  | 166/305.1 |

FOREIGN PATENT DOCUMENTS

| EP | 857776 A1 | 8/1998 |
| EP | 1584673 A1 | 10/2005 |
| EP | 1692196 A2 | 8/2006 |
| WO | 2009106743 A1 | 9/2009 |
| WO | 2009106744 A2 | 9/2009 |
| WO | 2012085865 A1 | 6/2012 |
| WO | 2013112503 A1 | 8/2013 |
| WO | 2013189868 A1 | 12/2013 |
| WO | 2014173844 A1 | 10/2014 |
| WO | 2016162392 A1 | 10/2016 |

OTHER PUBLICATIONS

AsphalteneParaffin Structural Interactions. Effect on Crude Oil Stability by Garcia (2001).
ISR w English Translation and Written Opinion for PCT/EP2020/085235 dated Feb. 11, 2021.

* cited by examiner

*Primary Examiner* — Silvana C Runyan
(74) *Attorney, Agent, or Firm* — Boyle Fredrickson S.C.

(57) ABSTRACT

A process for extracting a crude oil from a rock formation containing crude oil comprises the following steps:
(i) a first step of forced injection of a modified alkylphenol-aldehyde resin into the rock formation containing a crude oil, and
(ii) a second step of extracting the crude oil from the rock formation.

The modified alkyl phenol-aldehyde resin may be obtained by Mannich reaction of an alkylphenol-aldehyde condensation resin, with at least one C1-C8 aldehyde and/or at least one C1-C8 ketone, and at least one hydrocarbon compound having at least one alkyl polyamine group having between 1 and 30 carbon atoms. The alkylphenol-aldehyde condensation resin may be obtained by condensation of at least one alkylphenol substituted by at least one linear or branched alkyl group having 1 to 30 carbon atoms, with at least one compound selected from C1-C8 aldehydes and/or C1-C8 ketones.

20 Claims, No Drawings

PROCESS FOR EXTRACTING A CRUDE OIL WITH INJECTION OF RESIN

The present invention relates to a process for extracting a crude oil from a rock formation, comprising a step of forced injection of a alkylphenol-aldehyde resin modified by an alkyl polyamine as well as a step of extracting the crude oil from the rock formation.

The invention also relates to a process for adsorbing/desorbing the alkylphenol-aldehyde resin modified by an alkyl polyamine on a rock formation comprising steps of forced injection of the resin into an oil well, the adsorption of the resin in the rock formation of the well, and the desorption of the resin out of the rock formation.

STATE OF THE PRIOR ART

A crude oil mainly comprises two classes of products: maltenes and asphaltenes. The main constituents of maltenes are: oils (paraffins: saturated hydrocarbon compounds, and aromatics) and resins.

Paraffins consist of linear or branched alkanes and can be liquid, oily or solid. They may tend to precipitate, in particular during the extraction of crude oil from a well, during temperature drops, for example if the well is underwater. The precipitated paraffins are then deposited on the pipes/pipelines of the well and plug them.

Asphaltenes are present up to about 20% or less in most crudes. They can consist of very polar species which tend to be associated to form agglomerates. They constitute the heaviest component of petroleum crudes. Asphaltenes are composed of molecules including polycyclic, polyaromatic fragments, short aliphatic chains, and unlike hydrocarbons, they include heteroatoms such as N, O, S and metals (for example Ni, V, Fe). They are characterised by their insolubility in alkanes such as n-pentane or n-heptane, but they are soluble in aromatic solvents like toluene or xylene. The interaction of asphaltenes with their environment is a complex phenomenon, which is difficult to control.

Asphaltene precipitation, just like paraffin precipitation, can occur in oil production wells and pumping installations. Asphaltenes and paraffins present in crude oils from oil wells can precipitate and cause problems of filter clogging or well plugging.

This phenomenon leads to a loss of productivity and a reduction in the service life of the well. Without treatment allowing preventing this phenomenon, it is necessary to frequently dismantle drilling installations in order to clean them and the frequency of maintenance operations of the production sites represents a significant economic burden.

The main factors which promote the precipitation of asphaltenes are the variations in the volume composition of the crudes related to the drop in pressure relative to the initial pressure during their transport or related to their mixture with other extracted or injected fluids such as gas (essentially consisting of light alkanes).

The main factor which promotes the precipitation is the drop in temperature during the transport of extracted oil Concerning asphaltenes, the composition of the crude mainly influences the asphaltene precipitation phenomenon: light oils, having a low asphaltene content, are rich in alkanes in which the asphaltenes are poorly soluble, and these tend to precipitate in this medium. Heavy oils, which are rich in asphaltenes, comprise high amounts of intermediate compounds, such as resins, which are good solvents for asphaltenes, and delay or prevent their precipitation. However, in the crudes, the precipitation of asphaltenes often leads to the co-precipitation and the drive of other components such as resins or waxes due to their affinity.

In drilled underground rock formations, the extraction of fluids and the application of high pressure losses lead to the adsorption of these components on the rock causing a drop in permeability which can cause a blocking of the connection with the reservoir.

Modified alkylphenol-aldehyde resins are also known, which are obtained by Mannich reaction of an alkylphenol-aldehyde condensation resin with at least one aldehyde and at least one hydrocarbon compound having at least one alkylamine group, used in fuel compositions as anti-settling additives WASA (WO2012085865), for resistance to low temperatures (WO2013189868) and as antioxidants (WO2014173844). These additives are directly added to fuel compositions to improve their properties. In documents WO2012085865 and WO2013189868, the described technical effect consists in preventing the formation and the precipitation, or the settling, of paraffin crystals, in particular at low temperatures.

These modified alkylphenol-aldehyde resins have also already been described as additives which are added to compositions of crude petroleum and to petroleum products, in order to prevent the precipitation of asphaltenes (WO2016162392).

It is also known to treat crude petroleum rocks/reservoirs by forced injection of some compounds (or injection in a mode called "squeeze" mode), in particular in document WO2013112503 which describes a process for inhibiting the asphaltene deposits thanks to an organic polymer injected in forced mode, preferably selected from alkylphenol-formaldehyde resins, combined with a co-reactant preferably selected from silanes or non-metal oxides.

The Applicant has discovered that the forced injection into the rock of particular resins in crude oil extraction processes allowed a more efficient extraction of crude, when compared to the currently existing processes. More particularly, the Applicant has discovered that these particular resins have an excellent affinity for the rock, in which they are adsorbed then from which they are gradually desorbed when the well is recompleted. They thus allow limiting the amount of resin subsequently used in the composition of petroleum and/or the petroleum products, and facilitating the operations of extracting crude petroleum from the well. The Applicant has also discovered that these resins inhibit the precipitation of paraffins within the crude petroleum and in the well and facilitates the operations of pumping the crude petroleum.

OBJECT OF THE INVENTION

The first object of the invention is a process for extracting a crude oil from a rock formation containing it, comprising the following steps:
(i) a first step of forced injection into the rock formation of at least one compound consisting of a modified alkylphenol-aldehyde resin, said modified alkylphenol-aldehyde resin being obtainable by Mannich reaction of an alkylphenol-aldehyde condensation resin,
with at least one aldehyde and/or one ketone having 1 to 8 carbon atoms, preferably 1 to 4 carbon atoms;
and at least one hydrocarbon compound having at least one alkyl polyamine group, having between 1 and 30 carbon atoms, preferably between 4 and 30 carbon atoms,
said alkylphenol-aldehyde condensation resin being itself obtainable by condensation of at least one alkylphenol substituted by at least one linear or branched alkyl group having 1 to 30 carbon atoms, preferably a monoalkylphenol, with at least one aldehyde and/or one ketone having 1 to 8 carbon atoms, preferably 1 to 4 carbon atoms, then (ii) a second step of extracting crude oil from the rock formation.

According to a preferred embodiment of the invention, the modified alkylphenol-aldehyde resin is obtainable from p-nonylphenol, formaldehyde and at least one hydrocarbon compound having at least one alkyl polyamine group.

According to a preferred embodiment of the invention, the modified alkylphenol-aldehyde resin is obtainable from p-nonylphenol and has an average number of phenolic rings per molecule of modified p-nonylphenol-aldehyde resin, comprised between 6 and 25, preferably comprised between 8 and 17, and even more preferably comprised between 9 and 16.

According to a preferred embodiment of the invention, the hydrocarbon compound having at least one alkyl polyamine group comprises at least two primary amine groups and a fatty chain having 12 to 24 carbon atoms, preferably 12 to 22 carbon atoms.

According to a preferred embodiment of the invention, the modified alkylphenol-aldehyde resin is implemented in diluted form in an organic solvent, preferably in an aromatic solvent, preferably xylene, and optionally being in combination with a liquid hydrocarbon fraction, which is more preferably a fuel base, and even more preferably a diesel fraction, of the middle distillate type.

According to a preferred embodiment of the invention, the modified alkylphenol-aldehyde resin is injected into the rock formation in an amount sufficient to maintain a minimum concentration of said resin in the extracted crude oil over a sufficiently long production period, typically at least 6 months after the injection of the resin. Preferably, the resin is injected into the rock formation in an amount such that its concentration in the crude oil extracted from said formation, 6 months after the date of injection, is comprised between 10 and 2000 ppm by weight, preferably between 20 and 1500 ppm, preferably between 20 and 1000 ppm, preferably between 20 and 800 ppm, preferably between 20 and 700 ppm, preferably between 20 and 600 ppm, preferably between 20 and 400 ppm, relative to the weight of the crude oil. According to a particularly preferred embodiment, this concentration is comprised in the range of 400 to 700 ppm, more preferably 550 to 650 ppm by weight, relative to the weight of the crude oil.

This typically corresponds, for an injected resin solution comprising 25% by volume of resin, to a volume of resin solution injected into the rock formation comprised between 1 and 6 times the pore volume (porous volume) of the treated rock, preferably from 4 to 6 times the pore volume of the rock. The pore volume is measured according to the NF ISO 5017 standard.

According to a preferred embodiment of the invention, step (i) of forced injection is repeated at most once every 3 months, preferably once every 4 months, preferably once every 5 months, even more preferably once every 6 months, and even more preferably once every 12 months.

According to a preferred embodiment of the invention, the process comprises an additional step (i') of injecting water, gas and/or brine into the rock formation, this step preferably being carried out after step (i).

According to a preferred embodiment of the invention, the rock formation surrounds an oil wellbore.

According to a preferred embodiment of the invention, the process comprises an additional treatment step (i") selected from an increase in pressure, and/or an increase in temperature, and/or a mixture with at least one other fluid, said step preferably being carried out after step (i) and after step (i') if implemented.

According to another embodiment, the invention relates to a process for adsorbing/desorbing the resin as defined above, on a rock formation containing a crude oil, comprising the following steps:

the forced injection of the resin into the rock formation,
the adsorption of the resin on the rock formation,
the desorption of the resin from the rock formation containing it.

The extraction process according to the invention, implementing these resins, is more effective than the already known processes: it is effective on a wide variety of crudes, of varied compositions and with a small amount of resin.

The resin used according to the invention is inexpensive to implement because, more effective, and injected in forced or "squeeze" mode, it is therefore added in small amounts and is therefore more economical. It does not require a dedicated injection line, unlike an injection in continuous mode.

In what follows, and unless otherwise indicated, the limits of a range of values are comprised in this range, in particular in the expressions "comprised between" and "ranging/ranges/extends from . . . to . . . ".

Moreover, the expressions "at least one" and "at least" used in the present description are respectively equivalent to the expressions "one or more" and "greater than or equal".

DETAILED DESCRIPTION

The Process Implementing the Modified Alkylphenol-Aldehyde Resin

The extraction process according to the invention implements a step (i) of forced injection of a modified alkylphenol-aldehyde resin into a rock formation.

The forced injection step or "squeeze" consists in carrying out a forced injection of a product, typically in liquid form (aqueous or organic phase), containing one or more compounds, in a rock formation, preferably a petroleum well, usually under pressure. The injection is carried out by means of a pump disposed at the head of the well. The different injected fluids are thus sequentially pumped to be injected into the well and distributed in the rock formation. The injected compounds, "pushed against and into the rock", penetrate said rock and are adsorbed therein. They are then slowly released (desorbed) into the crude oil from the well, throughout the petroleum production. This forced injection should preferably be carried out regularly, that is to say several times a year.

This process is opposite to the process of continuous injection of conventional additives, which consists in injecting them continuously, without stopping, into the well, and not into the rock, throughout the operation of the well.

According to one embodiment of the invention, the forced injection is repeated once every 3 months, preferably once every 4 months, preferably once every 5 months, even more preferably once every 6 months, even more preferably once every 8 months, even more preferably once every 10 months, or even once a year. This extraction process comprising the combination of a modified alkylphenol-aldehyde resin and a forced injection mode allows the well to be treated only 4 times a year maximum, or even in most cases 2 times a year or only once a year, contrary to existing processes which require the well to be treated every 2 months by forced injection, or contrary to conventional continuous processes.

The process according to the invention allows extracting the crude oil while maintaining the paraffins dispersed in the hydrocarbon matrix and avoids or delays the phenomena of agglomeration, precipitation and deposition of the paraffins.

The process of the invention, in particular the step of injection in forced mode, has many advantages, in particular relative to the process for injecting, in continuous mode, conventional additives, and in particular, it allows:

- treating the periphery of the injection site,
- carrying out a preventive type treatment, upstream of the areas where it is possible to observe problems of precipitation of paraffins or precipitation of asphaltenes,
- preventing the risk associated with asphaltenes/paraffins in a larger area within the tank,
- limiting the periods of production stop and expensive maintenance interventions,
- not to mobilise injection material permanently,
- reducing the treatment frequency: proceed with the injection twice a year maximum, or once a year, depending on the size and the configuration of the well,
- more easily managing the stock of treatment products,
- performing a punctual treatment (or "spot treatment"), in particular in the absence of a dedicated injection line,
- the injected compounds to be gradually desorbed from the rock,
- not to deteriorate the well rock,
- not to plug the pores of the well,
- and avoiding incompatibility with the water of productions and other used additives such as for example the inhibitors of mineral deposits, demulsifiers . . . .

According to a particular embodiment of the invention, the extraction process comprises the steps:

(i) of forced injection of a modified alkylphenol-aldehyde resin (as defined above) in a rock formation, preferably a well, (i') of possible injection of water, gas and/or brine into the rock formation, (i") of possible well treatment(s) selected from an increase in pressure, and/or an increase in temperature, and/or a mixture of the crude oil with at least one other fluid, (ii) of extracting raw oil from the rock formation, preferably from a petroleum well.

In a particular mode, step (i') follows step (i). In another mode, step (i') precedes step (i). In a particular mode, step (i") follows step (i) or (i'). In another mode, step (i") precedes step (i) or (i').

The process may also comprise other steps between or before steps (i) and (i') or (i") and (ii), or else after these two steps, and in particular: a "pre-flush" or "pre-wash" step in which a first fluid, preferably aqueous fluid, is injected into the rock formation to prepare the rock of the tank and improve its wettability and therefore the adsorption of the resin (before step (i)). This first fluid may for example consist of a methanol/water mixture which is adsorbed only very small on the rock of the well and cleans the rock surface. This step is preferably performed before step (i).

After the "pre-flush" step, and always before step (i), a step of "flushing solvent (or flush or washing of the rock formation)" can then be carried out with an organic solvent preferably without additive, in order to ensure the transition between the aqueous phase and the organic phase and allow preparing the rock in the step (i) of injecting phenolic resin to promote the adsorption of the resin on the rock. The organic solvent, used in this step, is selected from those mentioned below, preferably a diesel/xylene 60/40 mixture.

The modified alkylphenol-aldehyde resin, in a preferred embodiment, is injected after these two "pre-flush" and "flush" steps. The resin then begins to be adsorbed in the rock.

In one embodiment, the resin is, prior to its injection, mixed with an organic solvent, in particular a solvent comprising a majority of aromatic compounds for example in C10 (heavy naphtha, Solvesso™ 150 aromatic fluid, Solvarex® 10 aromatic solvent . . . ) in a volume ratio resin/solvent of 50/50 v/v. This mixture may then be diluted itself in a mixture of solvents, preferably a diesel/xylene mixture in a volume ratio 60/40 v/v, at 50 (resin)/50 (solvent mixture), (volume ratio, v/v).

Finally, after step (i), an "overflush" step can advantageously be carried out, during which an organic solvent is injected to increase the penetration of the resin in the core of the rock so as to ensure its adsorption and thus promote a gradual desorption of the resin during the start of production and during the production of the well, and increase the time of efficiency at the time of production of crude petroleum. This organic solvent is preferably a mineral oil, diesel or any solvent mentioned in the present application.

In one embodiment, during the "overflush" step, the resin is pushed into the rock until its adsorption in said rock is at a distance of 2 m from the well, preferably at a distance greater than or equal to 2.5 m, even more preferably at a distance of 2.6 m from the well.

The Modified Alkylphenol-Aldehyde Resin

The extraction process according to the invention implements a modified alkylphenol-aldehyde resin which is obtainable by Mannich reaction of an alkylphenol-aldehyde condensation resin:

- with at least one aldehyde and/or ketone having 1 to 8 carbon atoms, preferably 1 to 4 carbon atoms;
- and at least one hydrocarbon compound having at least one alkyl polyamine group, having between 1 and 30 carbon atoms, preferably between 4 and 30 carbon atoms, said alkylphenol-aldehyde condensation resin being itself obtainable by condensation:

- of at least one alkylphenol substituted with at least one linear or branched alkyl group having 1 to 30 carbon atoms, preferably a monoalkylphenol,
- with at least one aldehyde and/or ketone having 1 to 8 carbon atoms, preferably 1 to 4 carbon atoms.

The alkylphenol-aldehyde condensation resin may be selected from any resin of this type already known and in particular, those described in the documents EP857776, EP1584673.

The modified alkylphenol-aldehyde resin according to the invention is advantageously obtained from at least one para-substituted alkylphenol. Nonylphenol is preferably used.

According to one embodiment, the average number of phenolic rings per molecule of nonylphenol-aldehyde resin is comprised between 6 and 25, preferably comprised between 8 and 17, and even more preferably comprised between 9 and 16.

The number of phenolic rings can be determined by nuclear magnetic resonance (NMR) or gel permeation chromatography (GPC).

Advantageously, the modified alkylphenol-aldehyde resin is obtained by implementation of the same aldehyde or the same ketone at the two stages of its preparation.

According to one preferred embodiment, the modified alkylphenol-aldehyde resin can be obtained from at least one aldehyde and/or a ketone selected from formaldehyde, acetaldehyde, propionaldehyde, butyraldehyde, 2-ethyl-hexanal, benzaldehyde and/or acetone. Preferably, the modified alkylphenol-aldehyde resin can be obtained from at least one aldehyde, preferably at least formaldehyde (or methanal).

According to one particular embodiment, the modified alkylphenol-aldehyde resin is obtained from at least one alkyl polyamine having at least two primary and/or secondary amine groups. In particular, the alkyl polyamine is advantageously selected from the primary or secondary polyamines substituted by, respectively, one or two alkyl groups comprising, preferably 12 to 24 carbon atoms, more preferably 12 to 22 carbon atoms.

According to one preferred variant, the modified alkylphenol-aldehyde resin is obtained from at least one alkyl polyamine having at least two primary amine groups.

In particular, the modified alkylphenol-aldehyde resin may advantageously be obtained from at least one alkyl polyamine in which all amine groups are primary amines.

According to another preferred variant, the modified alkylphenol-aldehyde resin is obtained from at least one alkyl polyamine having at least two primary amine groups, preferably three primary amine groups, and comprising a fatty chain having 12 to 24 carbon atoms, preferably 12 to 22 carbon atoms.

Alkyl polyamine is preferably a fatty-chain alkyl polyamine having 12 to 24 carbon atoms, preferably 12 to 22 carbon atoms.

Commercial alkyl polyamines are generally not pure compounds but mixtures. Among the marketed alkyl polyamines which are suitable, mention may in particular be made of fatty-chain alkyl polyamines marketed under the names Trinoram®, Duomeen®, Dinoram®, Triameen®, Armeen®, Polyram®, Lilamin® and Cemulcat®.

Mention may be made, by way of preferred example, of Trinoram®S which is a tallow dipropylenetriamine, also known under the name N-(Tallowalkyl)dipropylenetriamine (CAS 61791-57-9).

According to one embodiment, the modified alkylphenol-aldehyde resin is used alone, without solvent or dispersant, or additives.

In one embodiment, the modified alkylphenol-aldehyde resin is, before its injection, mixed with an organic solvent, preferably comprising at least 80% by weight of typically C10 aromatic compounds (heavy naphtha, Solvesso™ 150 aromatic fluid, Solvarex® 10 aromatic solvent, etc.) with a volume ratio resin/solvent of 50/50 v/v.

According to one variant of this embodiment, the modified alkylphenol-aldehyde resin previously mixed with an organic solvent as described above, is implemented in diluted form in a solvent, preferably aromatic, preferably xylene, optionally in combination with a liquid hydrocarbon fraction, more preferably a fuel base, and even more preferably a diesel fraction, and optionally in combination with other additives. According to a particularly preferred embodiment, the modified alkylphenol-aldehyde resin previously mixed with an organic solvent is implemented in the diluted form to 50% by volume (50/50 v/v dilution) in a diesel/xylene mixture having a volume ratio 60/40 v/v.

Crude Oils

The invention relates to a process for extracting crude oil, preferably an oil from a petroleum well. In this case the expression "crude oil" is synonymous with "crude petroleum".

The crude oil includes asphaltenes, that is to say the heavy fraction of crude petroleum, and is located in a natural reserve or rock formation, preferably underground, or underground ore. It is extracted via a well or "wellbore", which is a hole or shaft penetrating the rock formation containing the oil.

The crude oils from the well can be alone or mixed with other components, such as water, gas and/or brine, or other additives used during drilling (anti-limestone . . . ).

The invention aims at facilitating the extraction of this crude oil, by avoiding/inhibiting delaying/reducing the precipitation of paraffins. This phenomenon may relate to compositions having very varied paraffin contents.

The invention also aims at facilitating the extraction of this crude oil, by avoiding/inhibiting delaying/reducing the precipitation of paraffins.

In one embodiment, the amount of modified alkylphenol-aldehyde resin is injected into the rock formation in an amount such that its concentration in the crude oil extracted from said formation 6 months after the date of injection is comprised between 10 and 2000 ppm by weight, preferably between 20 and 1500 ppm, preferably between 50 and 1000 ppm, preferably between 70 and 800 ppm, preferably between 100 and 700 ppm by weight, relative to the weight of the crude oil. According to a particularly preferred embodiment, this concentration is within the range of 400 to 700 ppm, more preferentially from 550 to 650 ppm by weight.

Composition of Modified Alkylphenol-Aldehyde Resin and Possible Additives

According to one embodiment, the resin is, prior to its injection, implemented in diluted form in an organic solvent comprising a majority (at least 80% by weight) of aromatic compounds typically having 10 carbon atoms, with a volume ratio resin/solvent ranging from 20/80 to 80/20, preferably 40/60 to 60/40 and more preferably 50/50 v/v.

By way of example, the solvent is selected from: Solvarex 10®, Solvarex 10 LN®, Solvent Naphta®, Shellsol AB®, Shellsol D®, Solvesso 150®, Solvesso 150 ND®.

According to one embodiment, the modified alkylphenol-aldehyde resin solution thus obtained is then used in further diluted form in an additional solvent, preferably aromatic, preferably xylene, and optionally being in combination with a liquid hydrocarbon fraction, more preferably a fuel base, and even more preferably a diesel fraction.

By way of example, the solvent is selected from aliphatic and/or aromatic hydrocarbons and mixtures of hydrocarbons, for example gasoline, diesel, kerosene fractions, decane, pentadecane, toluene, xylene, ethylbenzene, polyethers. The solvent is preferably aromatic.

In one embodiment, the modified alkylphenol-aldehyde resin is diluted in a diesel or xylene fraction, or preferably in a diesel fraction/xylene mixture, with volume ratios diesel/xylene of 80/20, or preferably 60/40 (v/v).

Preferably, the modified alkylphenol-aldehyde resin solution is introduced in a volume amount of 50% v/v relative to the 60/40 diesel/xylene mixture.

In the final injected composition, the resin is typically present in an amount of 25% volume (25% solvent with C10 aromatics and 50% 60/40 v/v diesel/xylene mixture).

According to one embodiment, the modified alkylphenol-aldehyde resin is used in combination with a dispersing agent. This embodiment is preferred when said resin is diluted in a solvent such as in particular in a liquid hydrocarbon fraction.

By way of example, the dispersant is selected from surfactants, sulphonates, sulphonic acids (from naphthalene, from dodecylbenzene . . . ).

The mass concentration of the modified alkylphenol-aldehyde resin diluted in the final injected composition (with or without dispersant) can advantageously vary from 1 to 99.5%, preferably from 5 to 95%, more preferably from 10 to 90% and even more preferably from 30 to 90%.

The composition may also contain, in addition to the solvent, and/or the dispersant, other additives such as a polar dissolution adjuvant, such as 2-ethylhexanol, hexylene glycol, decanol, isodecanol and/or isotridecanol.

The viscosity of the modified alkylphenol-aldehyde condensation resin, diluted with 30% by mass of aromatic solvent, measured at 50° C. using a dynamic rheometer with a shear rate of 100 s$^{-1}$ is, preferably, comprised between 1000 and 10000 mPa·s, preferably between 1500 and 6000 mPa·s, and advantageously between 2500 and 5000 mPa·s.

The modified alkylphenol-aldehyde resin can also be used in a composition in combination with one or more additional additives.

As additional additives likely to be used in combination with the modified alkylphenol-aldehyde resin, mention may be made of: dispersants/detergents, corrosion inhibitors, biocides, demulsifiers, anti-foams, inhibitors of paraffin deposits; pour point depressants, paraffin anti-settling additives; $H_2S$ scavengers, organic deposit inhibitors such as naphthenic acids, mineral deposit inhibitors, markers, heat stabilisers, emulsifiers, friction reducing agents, surfactants, and mixtures thereof.

Among the other additional additives, particular mention may be made of:
a) antifoam additives, in particular (but without limitation) selected from polysiloxanes, oxyalkylated polysiloxanes, and fatty acid amides derived from vegetable or animal oils;
b) detergent and/or anti-corrosion additives, in particular (but without limitation) selected from the group consisting of amines, succinimides, alkenylsuccinimides, polyalkylamines, polyalkyles polyamines, polyetheramines; imidazolines; and the quaternary ammonium salts derived from the aforementioned compounds,
c) lubricity additives or anti-wear agent, in particular (but without limitation) selected from the group consisting of fatty acids and the ester or amide derivatives thereof, in particular glycerol monooleate, and mono- and polycyclic carboxylic acid derivatives;
d) crystallisation modifier additives, paraffin deposit inhibitor additives, pour point depressant additives; low temperature rheology modifiers such as ethylene/vinyl acetate (EVA) and/or ethylene/vinyl propionate (EVP) copolymers, ethylene/vinyl acetate/vinyl versatate (EA/AA/EOVA) terpolymers; ethylene/vinyl acetate/alkyl acrylate terpolymers; graft-modified EVA copolymers; polyacrylates; acrylate/vinyl acetate/maleic anhydride terpolymers; the amidated maleic anhydride/alkyl(meth)acrylate copolymers obtainable by reaction of a maleic anhydride/alkyl(meth)acrylate copolymer and an alkylamine or polyalkylamine having a hydrocarbon chain of 4 and 30 carbon atoms, preferably, of 12 to 24 carbon atoms; amidified alpha-olefin/maleic anhydride copolymers obtainable by a reaction of an alpha-olefin/maleic anhydride copolymer and an alkylamine or polyalkylamine, the alpha-olefin possibly being selected from alpha-olefin, in C10-C50, preferably in C16-C20 and the alkylamine or the polyalkylamine having, advantageously, a hydrocarbon chain of 4 and 30 carbon atoms, preferably of 12 to 24 carbon atoms. By way of examples of terpolymers, mention may be made of those which are described in EP01692196, WO2009106743, WO2009106744, U.S. Pat. Nos. 4,758,365 and 4,178,951,
e) acidity neutralisers.

Process for Adsorbing/Desorbing the Resin

The invention also relates to a process for adsorbing/desorbing the resin as defined above, in and from a rock formation containing a crude oil, comprising the following successive steps:
the forced injection of the resin into the rock formation,
the adsorption of the resin in the rock formation,
the progressive desorption of the resin from the rock formation containing it, by extraction of the crude oil.

According to the invention, the steps can be implemented successively.

According to one embodiment, the "pre-flush", "flushing solvent" and "overflush" steps can be implemented as previously described.

The examples below are given by way of illustration of the invention, and could not be interpreted so as to limit its scope.

EXAMPLES

Example 1

Synthesis of Modified Alkylphenol-Aldehyde Resin (Res1)

Step 1: In a first step, an alkylphenol-aldehyde resin is prepared by condensation of para-nonylphenol and formaldehyde (for example according to the procedure described in EP857776), with a viscosity at 50° C. comprised between 1800 and 4800 mPa·s (viscosity measured at 50° C. using a dynamic rheometer with a shear rate of 10 s$^{-1}$ on the resin diluted with 30% by weight of aromatic solvent (Solvesso 150®)).

Step 2: In a second step, the alkylphenol-aldehyde resin resulting from the first step is modified by Mannich reaction by adding 2 molar equivalents of formaldehyde and 2 molar equivalents of tallow dipropylenetriamine, known under the name N-(Tallowalkyl)dipropylenetriamine and marketed for example under the name Trinoram S®, relative to the alkylphenol-aldehyde resin resulting from the first step.

The characteristics of the resin (called Res1) obtained at the end of step 2 are listed in table 1 below:

TABLE 1

| Alkyl polyamine used | Dry matter (1 g/30 mn/200° C.) | Viscosity (mPa · s) (*) | $N_{Phe}$ (**) |
|---|---|---|---|
| Trinoram S ® | 70.10% | 4855 | 14.1 |

(*) Viscosity at 50° C.: measured on a resin diluted with 30% by weight of Solvesso 150 ® solvent, shear rate 10 s$^{-1}$, using a Haake RheoWin ® rheometer.
(**) Evaluation of the average number of phenolic rings per molecule of resin or $N_{Phe}$: measured by proton nuclear magnetic resonance.

Example 2

Injection in Squeeze Mode of Resin Res1 in a Rock Formation

The study was carried out on a real-size well whose characteristics are as follows:

TABLE 2

| Permeability (mDarcy) | 10 to 40 |
| --- | --- |
| Porosity | 0.16 to 0.20 |
| Length (m) | 500 to 1500 |
| Diameter (cm) | 8 to 20 |
| Temperature (° C.) | 110 to 150 |
| Pressure (psi) | 3000 to 5000 |
| Daily production rate (barrel/day) | 900 to 1200 |

A treatment composition was prepared by diluting the resin Res1 in an aromatic solvent (Solvesso 150) to obtain a product with 50% by volume of active ingredient, then by rediluting this mixture to 50% by volume in a diesel/xylene mixture (of ratio 60/40 by volume).

The well was treated as follows:
75 m³ of a solution MeOH/water: 50/50 are injected
75 m³ of a hydrocarbon solvent: Diesel/Xylene: 60/40 are injected
750 m³ of the above treatment composition are injected in forced mode.
A 1750 m³ overflush with 100% gas oil/diesel is carried out, 2 m from the well.

The test results are summarised in Table 3 below:

TABLE 3

| Res1 concentration in extracted crude oil (ppm weight of active ingredient) | Volume of produced oil (barrels) | Number of production days |
| --- | --- | --- |
| 684 | 100,000 | 100 |
| 504 | 150,000 | 150 |
| 360 | 200,000 | 200 |
| 252 | 250,000 | 250 |
| 144 | 300,000 | 300 |
| 108 | 350,000 | 350 |
| 100 | 400,000 | 400 |

It is observed that the concentration of res1 is maintained above 600 ppm per 100,000 produced barrels. The production of 100,000 barrels is carried out in 100 days.

After a production of 400,000 barrels of oil extracted from the well, the produced oil still contains 100 ppm of Res1.

The same test was reiterated, but by carrying out an overflush of 3250 m³ of diesel, instead of 1750 m³, 2.6 m from the well. The results are detailed in Table 4 below

TABLE 4

| Res1 concentration in extracted crude oil (ppm weight of active ingredient) | Volume of produced oil (barrels) | Number of production days |
| --- | --- | --- |
| 964 | 100,000 | 95 |
| 739 | 150,000 | 143 |
| 610 | 200,000 | 190 |
| 482 | 250,000 | 238 |
| 418 | 300,000 | 286 |
| 321 | 350,000 | 333 |
| 289 | 400,000 | 381 |

It is observed that the concentration of rest is maintained above 600 ppm for 200,000 produced barrels. The production of 200,000 barrels was carried out in 190 days.

After a production of 400,000 barrels of oil extracted from the well, the oil still contains 289 ppm of Res1.

The overflush volume increased by 54% allows producing more barrels in less days.

Given these results, it can be observed that the extraction process of the invention, which consists in injecting the resin Res1, in forced mode, in the rock formation of the well, then in extracting raw oil, allows maintaining a concentration which is sufficient to ensure the effectiveness of Res1 for more than 12 months.

The invention claimed is:

1. A process for extracting a crude oil from a rock formation containing it in an oil wellbore, the process comprising:
   (i) a first step of forced injection of an aqueous fluid into the rock formation;
   (ii) a second step of forced injection into the rock formation of a liquid product containing at least one compound consisting of a modified alkylphenol-aldehyde resin, said modified alkylphenol-aldehyde resin being obtainable by Mannich reaction of an alkylphenol-aldehyde condensation resin,
   with at least one aldehyde having 1 to 8 carbon atoms, or at least one ketone having 1 to 8 carbon atoms, or a combination thereof;
   and at least one hydrocarbon compound having at least one alkyl polyamine group having between 1 and 30 carbon atoms,
   said alkylphenol-aldehyde condensation resin being itself obtainable by condensation of at least one alkylphenol substituted by at least one linear or branched alkyl group having 1 to 30 carbon atoms,
   with at least one compound selected from the group consisting of aldehydes having 1 to 8 carbon atoms, ketones having 1 to 8 carbon atoms, and combinations thereof,
   said forced injection being carried out under pressure by a pump disposed at a head of said wellbore, then
   (iii) a third step of extracting crude oil from said wellbore.

2. The process according to claim 1, wherein the modified alkylphenol-aldehyde resin is obtainable from p-nonylphenol, formaldehyde and at least one hydrocarbon compound having at least one alkyl polyamine group.

3. The process according to claim 2, wherein the modified alkylphenol-aldehyde resin is obtainable from p-nonylphenol and the average number of phenolic rings per molecule of modified p-nonylphenol-aldehyde resin is comprised between 6 and 25.

4. The process according to claim 1, wherein the at least one hydrocarbon compound having at least one alkyl polyamine group comprises at least two primary amine groups and a fatty chain having from 12 to 24 carbon atoms.

5. The process according to claim 1, wherein the modified alkylphenol-aldehyde resin is injected into the rock formation in an amount adapted to provide a concentration in a crude oil extracted from said formation, 6 months after the date of injection, of between 10 and 2000 ppm by weight relative to the weight of the crude oil.

6. The process according to claim 1, in which step (i) of forced injection is repeated at most once every 3 months.

7. The process according to claim 1, comprising an additional step (i') of injecting water, gas, brine, or mixtures thereof into the rock formation.

8. The process according to claim 1, wherein the rock formation surrounds said oil wellbore.

9. The process according to claim 1, comprising an additional treatment step (ii') selected from the group consisting of: an increase in pressure, an increase in temperature, a mixture with at least one other fluid, and combinations thereof.

10. The process according to claim 1, wherein the liquid product contains said modified alkylphenol-aldehyde resin diluted in an organic solvent or in an organic solvent mixed with a liquid hydrocarbon fraction.

11. The process according to claim 1, wherein the modified alkylphenol-aldehyde resin is injected into the rock formation in an amount adapted to provide a concentration in a crude oil extracted from said formation, 6 months after the date of injection, of between 50 and 1000 ppm by weight relative to the weight of the crude oil.

12. The process according to claim 1, wherein the modified alkylphenol-aldehyde resin is injected into the rock formation in an amount adapted to provide a concentration in a crude oil extracted from said formation, 6 months after the date of injection, of 550 to 650 ppm by weight relative to the weight of the crude oil.

13. The process according to claim 10, where the modified alkylphenol-aldehyde resin is implemented in diluted form in the organic solvent in combination with a liquid hydrocarbon fraction.

14. The process according to claim 10, where organic solvent is an aromatic solvent.

15. The process according to claim 1, in which step (i) of forced injection is repeated at most once every 6 months.

16. The process according to claim 1, wherein the aqueous fluid of step (i) is a methanol/water mixture.

17. The process of claim 16, additionally comprising a step inserted after step (i) and before step (ii), the inserted step comprising forced injection into the rock formation of the organic solvent, devoid of the modified alkylphenol-aldehyde resin.

18. The process of claim 1, wherein the liquid product of step (ii) additionally comprises an organic solvent comprising one or more aromatic compounds at a volume ratio of solvent to resin of 50/50 v/v.

19. The process of claim 18, additionally comprising a step inserted after step (i) and before step (ii), the inserted step comprising forced injection into the rock formation of the organic solvent, devoid of the modified alkylphenol-aldehyde resin.

20. The process of claim 19, additionally comprising a further step inserted after step (ii) and before step (iii), the further step comprising forced injection into the rock formation of an organic solvent.

* * * * *